United States Patent [19]

Narcisse

[11] Patent Number: 4,593,273

[45] Date of Patent: Jun. 3, 1986

[54] OUT-OF-RANGE PERSONNEL MONITOR AND ALARM

[76] Inventor: Bernadine O. Narcisse, 10366 Miller Ave., Cupertino, Calif. 95014

[21] Appl. No.: 590,325

[22] Filed: Mar. 16, 1984

[51] Int. Cl.[4] ............................ G08B 1/08; H04B 1/40
[52] U.S. Cl. ..................... 340/539; 128/903; 340/505; 340/571; 340/572; 343/6.5 SS; 343/12 R; 455/69; 455/88
[58] Field of Search ............... 340/572, 573, 539, 506, 340/568, 571, 540, 502, 505; 128/903; 455/100, 88, 89, 90, 69; 343/6.5 R, 6.5 SS, 457, 6.8 R, 10, 12 R

[56] References Cited

U.S. PATENT DOCUMENTS

| | | | |
|---|---|---|---|
| 2,924,703 | 2/1960 | Sichak et al. | 455/69 X |
| 2,967,908 | 1/1961 | Gray et al. | 455/69 X |
| 3,157,871 | 11/1964 | Umanoff | 340/571 X |
| 3,317,841 | 5/1967 | Umanoff | 340/571 |
| 3,327,216 | 6/1967 | Sichak | 455/69 X |
| 3,478,344 | 11/1969 | Schwitzgebel et al. | 128/903 X |
| 3,618,067 | 11/1971 | DeVale et al. | 340/571 X |
| 3,633,199 | 1/1972 | Curry et al. | 340/571 X |
| 3,839,709 | 10/1974 | Sugiura | 340/572 X |
| 3,947,832 | 3/1976 | Rösgen et al. | 340/539 |
| 4,023,138 | 5/1977 | Ballin | 340/539 X |
| 4,112,421 | 9/1978 | Freeny, Jr. | 343/457 |
| 4,125,826 | 11/1978 | Rasmussen et al. | 340/531 X |
| 4,136,338 | 1/1979 | Antenore | 340/568 X |
| 4,260,982 | 4/1981 | DeBenedictus et al. | 340/568 X |
| 4,494,119 | 1/1985 | Wimbush | 343/457 |

FOREIGN PATENT DOCUMENTS

| | | | |
|---|---|---|---|
| 3215942 | 11/1983 | Fed. Rep. of Germany | 340/572 |
| 2301054 | 9/1976 | France | 340/572 |
| 2386875 | 12/1978 | France | 128/903 |
| 2412896 | 8/1979 | France | 340/568 |
| 2482338 | 11/1981 | France | 340/572 |
| 2112600 | 7/1983 | United Kingdom | 340/571 |

*Primary Examiner*—Glen R. Swann, III
*Assistant Examiner*—Thomas J. Mullen, Jr.
*Attorney, Agent, or Firm*—Paul L. Hickman

[57] ABSTRACT

An out-of-range monitor and alarm system that may be used by a convalescent home or the like to alert an attendant in the home that a supervised person has walked beyond a predetermined prescribed distance. The system includes a base unit that transmits a signal at a frequency F1 to a receiver in a mobile unit carried by the supervised person. The receiver includes a threshold circuit that is adjustable to correspond to the prescribed distance and produces a threshold output signal whenever the F1 signal detected by the receiver drops below the threshold level. In response to the threshold output signal, a transmitter in the mobile unit produces an F2 output signal to a receiver in the base unit, which in turn sounds an alarm indicating that the mobile unit has lost adequate F1 signal strength, as determined by the threshold adjustment, by exceeding the range prescribed for the supervised person.

13 Claims, 2 Drawing Figures

OUT-OF-RANGE PERSONNEL MONITOR AND ALARM

BACKGROUND OF THE INVENTION

1. Field of the Invention

This invention relates generally to alarm systems and particularly to a personnel monitor and alarm system that alerts a base unit in a home, sanitarium, or the like, when a child or ambulatory patient may be straying out of prescribed range from the base unit.

2. Description of the Prior Art

Many devices have been developed in an attempt to successfully monitoring and detecting the passage of person from an unconfined area of predetermined size. For example, U.S. Pat. No. 3,478,344 to Schwitzgebel et al describes a behavior supervision system including four spaced base transceivers communicating with mobile transceivers mounted to the belt of each of a plurality of persons to be supervised so that the four base units can pinpoint the location of each mobile unit and sound an alarm if one leaves a predetermined area. Another alarm system is disclosed in U.S. Pat. No. 3,947,832 which describes a miner's helmet containing a radio transmitter that will alarm a base unit whenever the miner enters a danger zone.

SUMMARY OF THE INVENTION

Briefly described, the invention disclosed herein includes a small low powered transmitter and a threshold adjustable receiver in a small mobile unit, and a low power transmitter and a receiver in the base unit. The base unit transmits a continuous output signal at a first frequency that is detectable by the receivers in the mobile units. Whenever the threshold level in a mobile unit receiver is adjusted to the point at which it cannot detect that first frequency signal from the base unit, the mobile transmitter becomes activated and emits an output signal at a second frequency that is detected by the base unit receiver which then produces a suitable alarm that indicates to the base unit personnel that a mobile unit has strayed out of the range predetermined by the threshold level adjustment in that mobile unit. If desired, the activated mobile transmitter may also initiate an alarm to warn the straying person carrying the mobile unit.

The principal object of the invention, therefore, is to provide a means for supervisory personnel at a base unit to become alerted when supervised personnel carrying a mobile unit leave a prescribed area.

Another object of the invention is to alert supervised persons carrying a mobile unit responsive to a base unit transmitter that they are straying from a predetermined prescribed area.

These and other objects and advantages of the present invention will no doubt become apparent upon a reading of the following descriptions and a study of the several figures of the drawing.

DETAILED DESCRIPTION OF THE PREFERRED EMBODIMENT(S)

Figure 1:
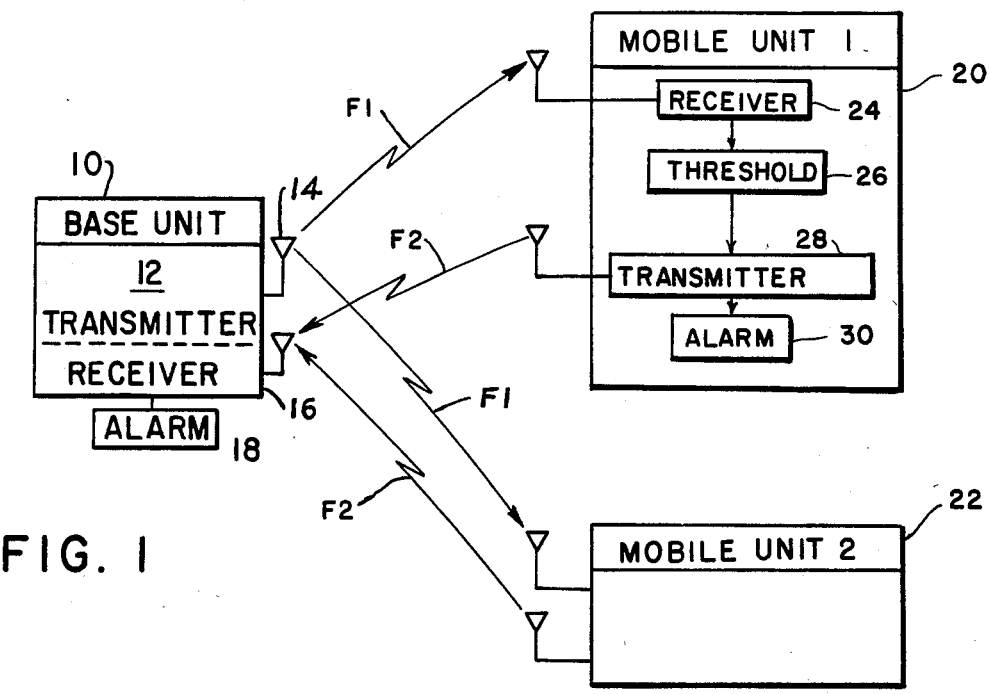
FIG. 1 is a block diagram illustrating a base unit and a plurality of mobile, units of the out-of-range monitor and alarm.

As illustrated in FIG. 1, the invention includes a base unit 10 which preferably includes a radio transmitter 12 which transmits from its antenna 14 a very low power signal that may have a maximum range from the base unit to a sensitive receiver at a distance of only approximately 800 to 1000 meters. The transmitter 12 produces a signal at a first frequency which preferably is a very low power VHF or UHF radio signal but which, if desired, may be a sonic signal in the supersonic range. The signal may be continuous or intermittent in nature.

The base unit 10 also includes a receiver 16 that is tuned to receive a fixed frequency at a second frequency that is sufficiently separated from the first frequency signal from the transmitter 12 so that the first frequency is undetectable by the receiver 16. An audible alarm 18 is coupled to the output of the receiver 16 and is responsive to a signal at the second frequency detected by the receiver. While not essential, it is preferable that both the first and second frequency signals are modulated with an audible tone as will be subsequently discussed. The alarm 18 may therefore comprise the audible signal modulated on the second frequency, or may be triggered by it to sound a bell or other audible alarm.

The monitor and alarm system also includes one or more identical mobile units 20 or 22 which may be sufficiently small in size to be strapped to the wrist of a supervised person or may be worn on the belt together with a small power pack. As illustrated in the mobile unit 20, each unit includes a fixed frequency receiver 24 tuned to the first frequency transmitted by the base unit 10. The receiver output signal, which is preferably a tone modulated on the first frequency carrier signal, is adjustably controlled by a threshold circuit 26 which generates an output signal only when the detected receiver output signal falls below an amplitude level determined by the adjustment of the threshold circuit. Thus, the threshold circuit 26 may be adjusted to produce an output signal whenever the mobile unit is moved out of an area within which the base unit transmitted first frequency may be detected. Stated differently, the threshold circuit 26 on any mobile unit may be adjusted to produce an output signal corresponding to some predetermined prescribed distance from the base unit.

The threshold circuit 26 in each mobile unit controls the operation of a transmitter 28 which transmits an output signal at the second fixed frequency only upon receiving an output signal from the threshold circuit 26. Thus, whenever a mobile unit leaves an area prescribed by the setting of the threshold circuit 26, the transmitter 28 produces a second frequency signal which is detected by the base unit 10 to sound the alarm 18 therein. If desired, the mobile unit transmitters may also include an audible alarm 30, preferably producing an output signal at the modulated tone frequency of the transmitted second frequency, for alerting the mobile unit wearer that the prescribed range has been exceeded.

Figure 2:
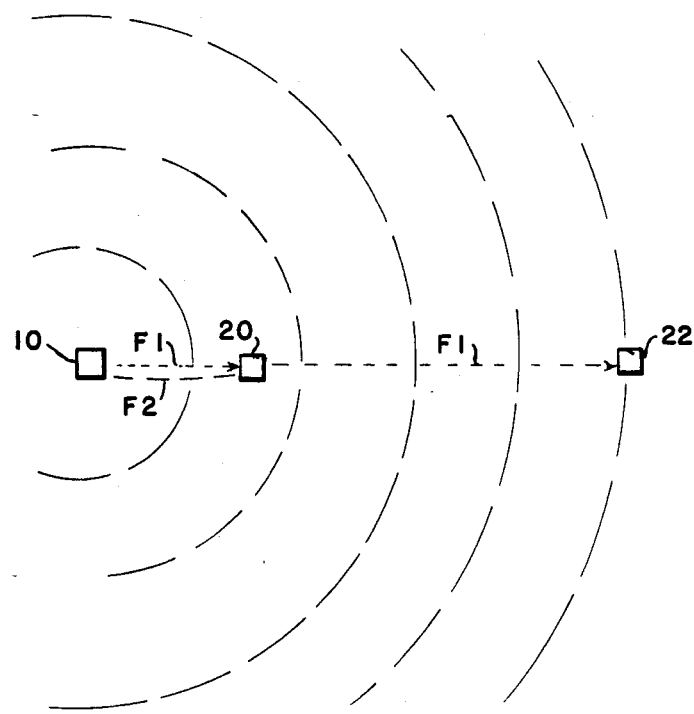
FIG. 2 is a schematic diagram illustrating typical operation of the monitor and alarm in the field.

FIG. 2 schematically illustrates a method of operation of the monitor and alarm system. In FIG. 2 the base unit 10 may be located, for example, in a convalescent hospital for ambulatory patients who must take short walks from the hospital. The mobile unit 20 may be carried by a first patient who may stroll within only a 150 meter radius from the hospital. The threshold circuit 26 in that mobile unit 20 is therefore adjusted to a value corresponding to a 150 meter distance so that the transmitter 28 will generate its second frequency output signal at any distance exceeding that distance. A second mobile unit 22 may be carried by a second patient who is permitted to walk perhaps 500 meters from the base unit. Therefore, if it is assumed that both the first and second patients walk together, the mobile unit carried by the first patient will sound a base unit alarm upon its exceeding the 150 meter range whereas the second patient's mobile unit will permit a much further ranging. The alarm at the base unit indicating that a patient has crossed the prescribed boundary will then cause an attendant to fetch the errant patient.

While the invention has been described for use in a rest home and for ambulatory patients, it is clear that it may be used for controlling children in a playground or at a picnic. The alarm may also be valuable for training hunting dogs or other animals by substituting the optional alarm 30 in the mobile unit for a unit that gives the animal a gentle electrical shock if it extends its range beyond a prescribed amount.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An out-of-range alarm system for generating an alarm whenever a mobile unit in the system extends beyond a prescribed limit from a base unit, said alarm system comprising;
    a fixed base unit having therein a transmitter for generating an omnidirectional output signal at a first frequency, said output signal emanating from a single source point, a receiver for detecting a signal at a second frequency, and an alarm associated with said receiver for producing an alarm signal upon the detection of said second frequency signal; and
    at least one mobile unit having a receiver for detecting said first frequency signal transmitted by said base unit, threshold circuitry coupled to said receiver for generating a threshold output signal upon a failure of said mobile unit receiver to detect said first signal at a predetermined signal strength, and a transmitter coupled to said threshold circuitry for generating an output signal at said second frequency in response to said threshold output signal.

2. The alarm system claimed in claim 1 further including adjustment means associated with said threshold circuitry for adjusting said threshold output signal to correspond to a prescribed distance of said mobile unit from said base unit.

3. The alarm system claimed in claim 2 wherein said first frequency signal is a continuous fixed frequency signal, and wherein said second frequency is displaced from said first frequency by an amount necessary to prevent said base unit receiver from detecting said first frequency signal.

4. The alarm system claimed in claim 3 wherein said first and second frequency signals are tone modulated UHF radio signals.

5. The alarm system claimed in claim 3 wherein said first and second frequency signals are tone modulated VHF radio signals.

6. The alarm system claimed in claim 3 wherein said first and second frequency signals are supersonic signals.

7. The alarm system claimed in claim 4 further including an alarm within said mobile unit and responsive to activation of its transmitter.

8. The alarm system claimed in claim 7 wherein said mobile unit is housed in a wrist mounting.

9. A method for alarming a base unit that a mobile unit associated with said base unit has exceeded a predetermined distance from said base unit, said method comprising the steps of:
    transmitting from a single, fixed base unit a first signal to a receiver in the mobile unit;
    adjusting an output signal from said mobile unit receiver in a threshold circuit that generates a threshold output signal only upon failure of said receiver to detect said first signal at a signal strength as determined by the adjustment of said threshold circuit;
    transmitting from said mobile unit a second signal in response to said threshold output signal, and
    receiving in said base unit said second signal and generating an alarm in response thereto.

10. The method claimed in claim 9 further including the step of:
    providing in said mobile unit an alarm triggered upon the activation of said mobile unit transmitter.

11. An out-of-range alarm system for generating an alarm whenever a mobile unit in the system extends beyond a prescribed limit from a base unit, said alarm system comprising;
    a base unit including means for generating an omnidirectional first signal, means for detecting a second signal, and an alarm operative to produce an alarm signal upon the detection of said second signal; and
    at least one mobile unit including means for detecting said first signal, threshold circuitry responsive to said detected first signal and operative to generate a threshold output signal when said first signal falls below a predetermined signal strength, and means coupled to said threshold circuitry for generating said second signal in response to said threshold output signal.

12. The alarm system claimed in claim 11 further including adjustment means associated with said threshold circuitry for adjusting said threshold output signal to correspond to a prescribed distance of said mobile unit from said base unit.

13. The alarm system claimed in claim 12 wherein said first signal is a continuous fixed frequency signal, and wherein said second signal is a continuous fixed frequency signal whose frequency is displaced from said first frequency by an amount necessary to prevent said base unit receiver from detecting said first frequency signal.

* * * * *